C. MARGESON.
AGRICULTURAL IMPLEMENT.
APPLICATION FILED NOV. 23, 1911.
1,019,330.
Patented Mar. 5, 1912.
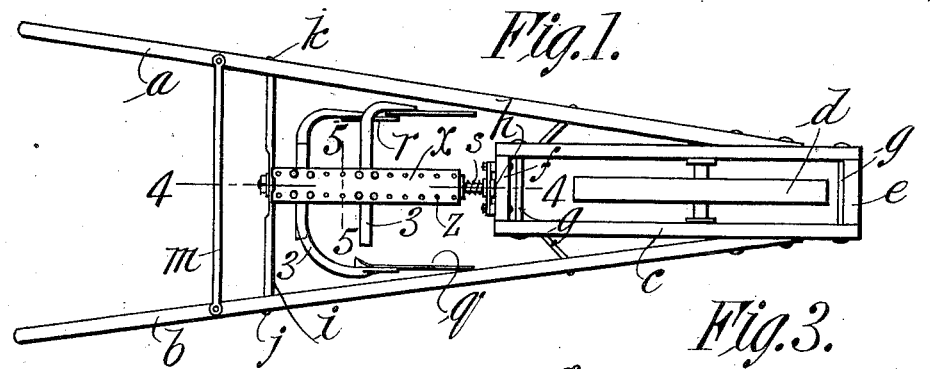
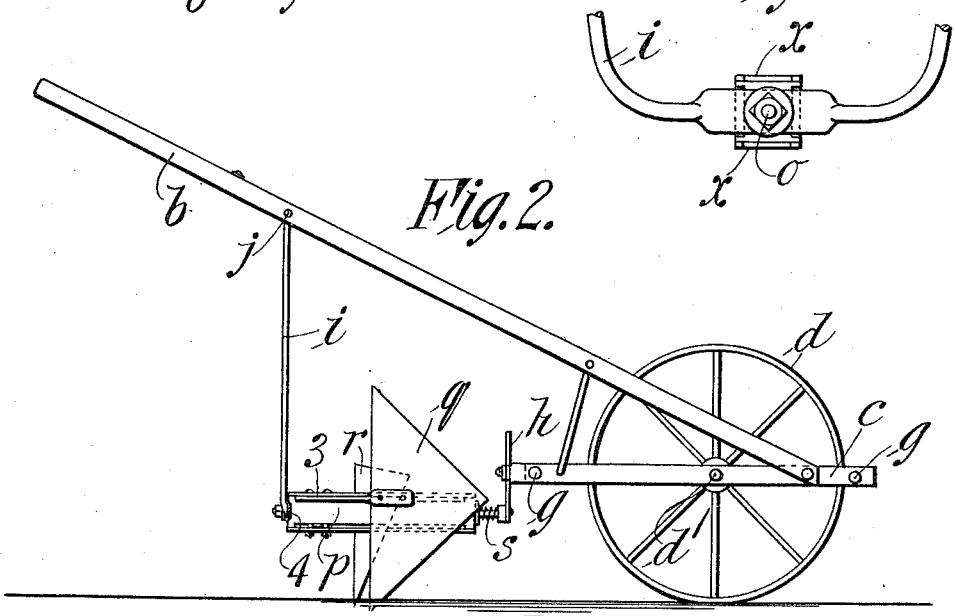
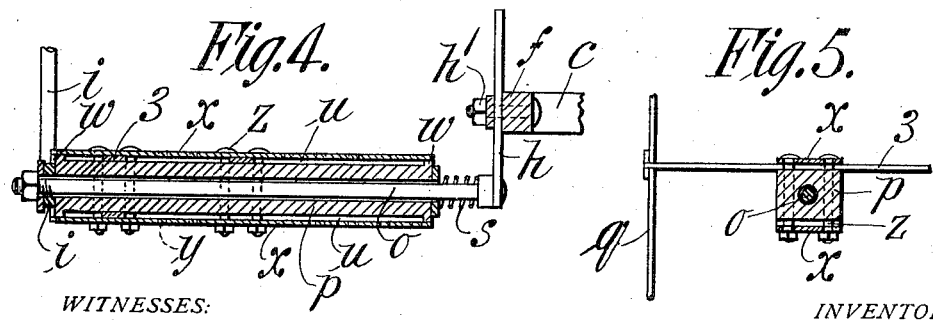
WITNESSES:
H. L. Sprague
Harry W. Bowen
INVENTOR,
Christopher Margeson,
BY
Chapin & Co.
ATTORNEY.

UNITED STATES PATENT OFFICE.

CHRISTOPHER MARGESON, OF SPRINGFIELD, MASSACHUSETTS.

AGRICULTURAL IMPLEMENT.

1,019,330.  Specification of Letters Patent.  Patented Mar. 5, 1912.

Application filed November 23, 1911. Serial No. 661,997.

*To all whom it may concern:*

Be it known that I, CHRISTOPHER MARGESON, a citizen of the United States of America, residing at Springfield, in the county of Hampden and State of Massachusetts, have invented new and useful Improvements in Agricultural Implements, of which the following is a specification.

This invention relates to improvements in hand operated agricultural implements, and more particularly it relates to hand cultivators in which the operator manually pushes the machine between the rows to be cultivated.

The invention consists, broadly, of a suitable framework supported at its forward end by a wheel, the opposite end of the frame being designed to be grasped by the operator.

A further object of the invention is in providing means for rotatably mounting the elements which engage the ground so that different shapes and depths of furrow may be cut.

In the drawings forming part of this application,—Figure 1 is a plan view of the invention showing a supporting wheel at one end of the frame, and the devices for rotatably supporting the hoe elements. Fig. 2 is a side elevation. Fig. 3 is a detailed view of the U-shaped bar which supports one end of the rotatably mounted hoe elements. Fig. 4 is a sectional view on the line 4—4 of Fig. 1, illustrating the manner in which the hoe elements are rotatably supported and locked in position for use. Fig. 5 is a transverse sectional view through the supporting means for the hoe elements.

Referring to the drawings in detail, $a$ and $b$ designate the handle-bars of the implement which are arranged in the usual inclined position and extend forwardly to a horizontal frame $c$ in which is rotatably mounted the supporting wheel $d$ by means of the axle member $d^1$. The frame $c$ is provided with spacing bars $e$ and $f$ and secured together by means of the bolts $g$. Depending from the rear end of the frame $c$ is a hanger $h$, and depending from the rear portions of the handle-bars $a$ and $b$ is a U-shaped supporting brace-bar $i$ attached to the handle-bars at $j$ and $k$. Immediately in the rear of this U-shaped brace-bar $i$ is a second brace-bar $m$. The lowermost portion of the brace-bar $i$ supports one end of the rod $o$ which extends forwardly and is secured to the hanger $h$ by a nut $h^1$. Rotatably mounted on the rod $o$ is a block $p$ which supports the hoe elements $q$ and $r$. This block is designed to be normally pushed rearwardly by means of the spring $s$ which is interposed between the hanger $h$ and the forward end of the block $p$. The block $p$ is provided with a recessed portion $u$ on the upper and lower sides, and supporting the shoulder element $w$ at the ends thereof on which rest clamping plates $x$ which are provided with openings $y$ through which pass the bolts $z$. Located in the recessed portion $u$ and beneath the plates $x$ are the arms 3 which support the hoe elements $q$ and $r$, whereby when the bolts $z$ are tightened, these arms will be securely clamped to the block $p$. It is obvious that they may be adjusted laterally so as to vary the width of the furrow or spaced longitudinally of each other, so as to vary the manner in which the soil will be stirred up.

4 designates a locking notch in the rear end of the block $p$ which engages the forward lower portion of the brace-bar $i$, as indicated in Fig. 2. The spring $s$ serves to hold this notch in engagement with the brace-bar $i$ whereby the block and hoe elements will be locked in position for use.

When it is desired to rotate the block $p$, the operator pushes forward on the same against the tension of the spring $s$ to disengage or unlock the notch 4 from the brace-bar $i$. After the block $p$ has been rotated so as to bring the proper hoe elements into use, the operator releases his grasp on the block and the spring $s$ will then force the same rearwardly, bringing the notch 4 into engagement with the brace-bar $i$.

It should be understood that there are two notches 4 in the end of the block $p$ so that the block may be held in positions with the hoe elements engaging the ground, or elevated therefrom for covering the implement from place to place. In order to accomplish this result, the notches 4 must, of course, be arranged at substantially right angles to each other.

It is clear that my improvement permits, by reason of its lateral adjustment, the hoe elements to be placed so that they will produce separate furrows when in use: That is to say, the rear set of hoe elements will not follow in the furrows produced by the forward set.

What I claim, is:—

1. In a hand-operated implement of the kind described, the combination with the frame thereof and its supporting wheel, of a brace-bar, a hanger-bar attached to the frame, a rod extending therebetween, a block rotatably supported on the rod, two sets of hoe elements, and devices for securing and laterally adjusting the hoe elements to the block, whereby when the block is rotated a different set of hoe elements may be brought into use, and each set of hoe elements will produce separate furrows.

2. In a hand-operated implement of the class described, the combination with the frame thereof, a supporting wheel, a hanger-bar secured to the frame, a brace-bar longitudinally spaced from the hanger-bar, a rod extending between the hanger and brace-bars, a block rotatably mounted on the rod and provided with recessed upper and lower edges, the ends of the channel having shoulder elements, clamping plates resting on the shoulder elements and provided with openings therethrough, bolts for securing the plates to the block, hoe elements, arms attached to said elements, and located under the plates and in the recessed portions of the block, whereby the hoe elements may be adjustably secured to the block, and devices to lock the block after being rotated on said rod to bring a different set of hoe elements into use.

CHRISTOPHER MARGESON.

Witnesses:
HARRY W. BOWEN,
FRANKLIN G. NEAL.

Copies of this patent may be obtained for five cents each, by addressing the "Commissioner of Patents, Washington, D. C."